(12) United States Patent
Kobori

(10) Patent No.: US 10,789,095 B2
(45) Date of Patent: Sep. 29, 2020

(54) DATA PROCESSING SYSTEM AND DATA PROCESSING METHOD

(71) Applicant: NEC Corporation, Minato-ku, Tokyo (JP)

(72) Inventor: Tomoyoshi Kobori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 168 days.

(21) Appl. No.: 15/923,141

(22) Filed: Mar. 16, 2018

(65) Prior Publication Data

US 2018/0276037 A1 Sep. 27, 2018

(30) Foreign Application Priority Data

Mar. 24, 2017 (JP) ................................. 2017-059348

(51) Int. Cl.
G06F 9/48 (2006.01)

(52) U.S. Cl.
CPC ...... *G06F 9/4843* (2013.01); *G06F 2209/483* (2013.01)

(58) Field of Classification Search
CPC ...... G06F 9/3001; G06F 9/3867; G06F 15/80; G06F 2207/3888
See application file for complete search history.

(56) References Cited

U.S. PATENT DOCUMENTS

| | | | | |
|---|---|---|---|---|
| 7,110,407 B1 * | 9/2006 | Khanna | ................... | H04L 45/00 370/392 |
| 2003/0163669 A1 * | 8/2003 | DeLano | ................ | G06F 9/3828 712/24 |
| 2004/0193741 A1 * | 9/2004 | Pereira | ..................... | G11C 8/04 710/1 |
| 2006/0212683 A1 * | 9/2006 | Matsui | .................. | G06F 9/3824 712/220 |
| 2008/0141001 A1 * | 6/2008 | Chung | .................. | G06F 9/3851 712/216 |
| 2012/0216012 A1 * | 8/2012 | Vorbach | .................. | G06F 8/443 712/11 |
| 2016/0342422 A1 * | 11/2016 | Langhammer | ........ | G06F 9/3012 |

FOREIGN PATENT DOCUMENTS

JP 2000-163388 A 6/2000

* cited by examiner

*Primary Examiner* — Dong U Kim

(57) ABSTRACT

A data processing system includes a plurality of calculation processors cascaded and a plurality of counters connected to the plurality of calculation processors, respectively. The plurality of calculation processors process a task in an order in which the plurality of calculation processors are cascaded. A count value of an individual one of the plurality of counters is incremented when a corresponding one of the calculation processors starts to process a task and is decremented when a calculation processor in a lowermost stage among the plurality of calculation processors ends the task.

10 Claims, 7 Drawing Sheets

DATA PROCESSING SYSTEM

DATA PROCESSING SYSTEM AND DATA PROCESSING METHOD

TECHNICAL FIELD

This application is based upon and claims the benefit of the priority of Japanese patent application No. 2017-059348, filed on Mar. 24, 2017, the disclosure of which is incorporated herein in its entirety by reference thereto.

The present invention relates to a data processing system and a data processing method.

BACKGROUND

In signal processing in which signals such as image data or voice data are handled, it is often the case that many consecutive data (stream data) is handled as calculation target data and that a plurality of kinds of processing such as FFT (Fast Fourier Transform) and filtering are repeatedly executed on many data. In addition, when calculation processing having features such as the above FFT is executed, dedicated hardware for executing FFT, filtering, etc. is often used.

Specifically, DSPs (Digital Signal Processors) or the like on which algorithms corresponding to FFT and filtering are implemented are prepared. In addition, an upper control module of the DSPs or the dedicated hardware controls the calculation processing executed by processors such as the DSPs as tasks. For example, as illustrated in FIG. 7, small- or medium-size data buffers 212 and 222 are connected in between calculation processors (calculation blocks) 211 to 231 that execute processing such as FFT and filtering. An external controller 201 is an upper control module of the calculation processors 211 to 231 and executes a single task by using the plurality of calculation processors.

In this way, in a data processing system in which stream data is handled, a configuration and a scheme in which a plurality of calculation modules and an upper control module are prepared are often adopted. With this configuration and scheme, the granularity of the task control can be made coarse, and the execution control load of the upper control module can be reduced.

In addition, by connecting calculation processors to each other via a data buffer and causing the buffer to receive and transmit data, the memory access latency can be reduced. As a result, the calculation efficiency of the data processing system can be improved.

In addition, there are the following two methods as a technique for minimizing the calculation processing latency between different tasks.

In the first method, the calculation processing latency between tasks is hidden by executing processing on a plurality of streams as a single task.

In the second method, the latency of the start of calculation processing is minimized by controlling the input of a task to a calculation block with a FIFO (First In First Out) memory and a task input controller.

In addition, as described in Patent Literature (PTL) 1, there is a data processor that causes a plurality of processors to perform a series of a plurality of kinds of processing asynchronously.

PTL 1: Japanese Patent Kokai Publication No. JP2000-163388A

SUMMARY

The disclosure of the above Citation List is incorporated herein by reference thereto. The following analysis has been made by the present inventors.

As described above, there are various methods for minimizing the calculation processing latency between different tasks. However, with the above methods, particularly with the second method in which the input of a task to a calculation processor is controlled by a FIFO and a task input controller, it is difficult for an upper control module (an external controller) to perform task management.

Specifically, with this method, when tasks are continuously inputted to calculation processors, an individual one of the calculation processors executes a task inputted thereto independently as much as possible. Thus, it is difficult to grasp which task has been completely executed by an individual calculation processor at a certain time point. In particular, in a situation in which the same calculation processing is executed repeatedly, the above problem is significant.

Accordingly, there is a need in the art to provide a data processing system and a data processing method that enable accurate grasping of task execution statuses.

According to a first aspect of the present disclosure, there is provided a data processing system, including: a plurality of calculation processors cascaded; and a plurality of counters connected to the plurality of calculation processors, respectively. The plurality of calculation processors process a task in an order in which the plurality of calculation processors are cascaded. A count value of an individual one of the plurality of counters is incremented when a corresponding one of the calculation processors starts to process a task and is decremented when a calculation processor in a lowermost stage among the plurality of calculation processors ends the task.

According to a second aspect of the present disclosure, there is provided a data processing method using a data processing system including a plurality of calculation processors cascaded and a plurality of counters connected to the plurality of calculation processors, respectively. The data processing method comprises: an individual one of the plurality of calculation processors processing a task in an order in which the plurality of calculation processors are cascaded. The method further comprises: incrementing a count value of one of the plurality of counters when a corresponding one of the calculation processors starts to process a task. The method further comprises: decrementing the count value of the counter when a calculation processor in a lowermost stage among the plurality of calculation processors ends the task.

According to the individual aspects of the present disclosure, there are provided a data processing system and a data processing method that contribute to enabling accurately grasping of task execution statuses.

PREFERRED MODES

Figure 1:
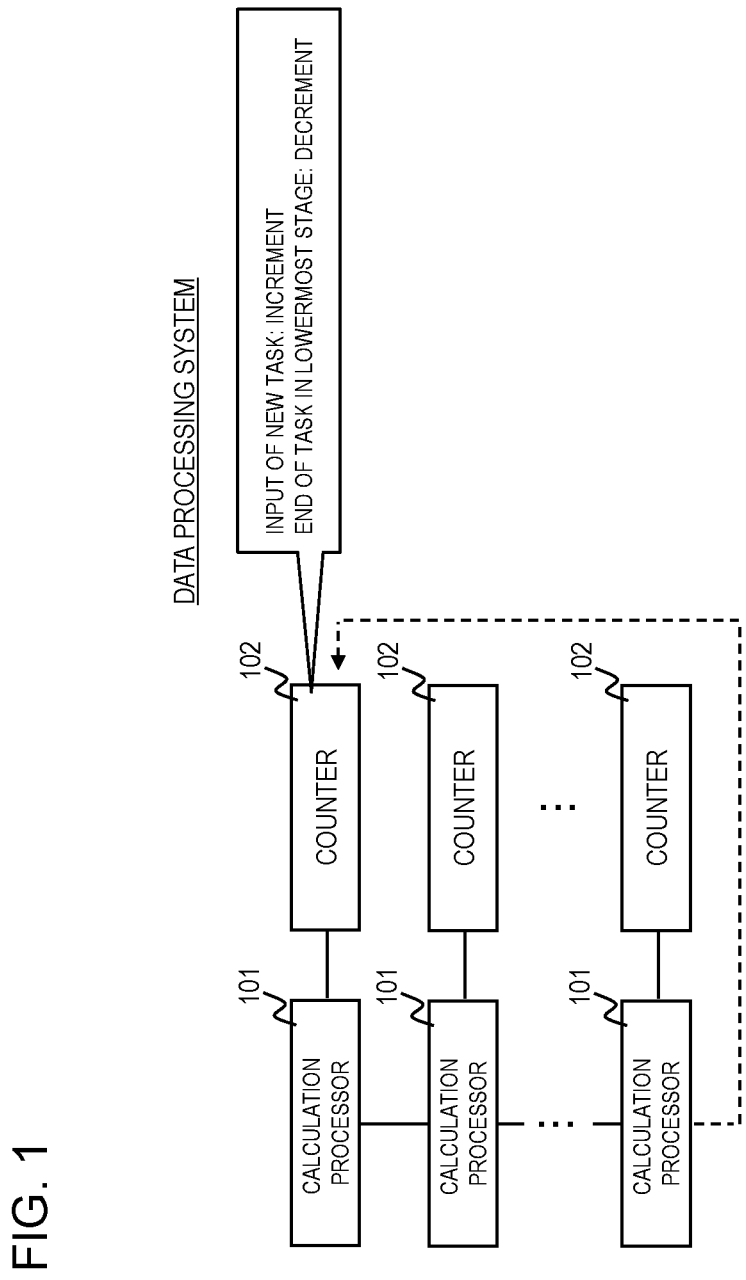
FIG. 1 illustrates an outline according to an exemplary embodiment.

First, an outline of an exemplary embodiment will be described. Reference characters in the following outline denote various elements for the sake of convenience and are used as examples to facilitate understanding of the present invention. Namely, the description of the outline is not intended to indicate any limitations. An individual connection line between blocks in an individual drawing signifies both one-way and two-way directions. An arrow schematically illustrates a principal signal (data) flow and does not exclude bidirectionality. It goes without saying that an input/output ports are present at the input end/output end of each connection line although not explicitly shown in the circuit diagram, the block diagram, the internal configuration diagram, the connection diagram and the like described in the present disclosure. The same is true for an input/output interface.

A data processing system according to an exemplary embodiment includes: a plurality of calculation processors 101 cascaded; and a plurality of counters 102 connected to the plurality of calculation processors 101, respectively (see FIG. 1). The plurality of calculation processors 101 process a task in an order in which the plurality of calculation processors 101 are cascaded. A count value of an individual one of the plurality of counters 102 is incremented when a corresponding one of the calculation processors 101 starts to process a task and is decremented when a calculation processor in a lowermost stage among the plurality of calculation processors 101 ends the task.

By referring to the count value of an individual counter 102 included in the above data processing system, the number of tasks that have been executed by the corresponding calculation processor 101 but not by the calculation processor(s) 101 in the subsequent stage(s) can be grasped. For example, in FIG. 1, when the calculation processor 101 in the initial stage processes a task, the count value of the corresponding counter 102 is set to "1". This count value remains until the calculation processor 101 in the lowermost stage ends this task, and when the calculation processor 101 in the lowermost stage ends the task, the count value is decremented to "0". Namely, by reading the count value from the counter 102 corresponding to the calculation processor 101 in the initial stage, the number of tasks that have been executed by this calculation processor 101 (or the number of tasks being executed), the number of tasks that have not been ended in the data processing system as a whole, and the like can be grasped.

In other words, an individual counter 102 holds the number of tasks that have been executed by the corresponding calculation processor 101 but not by the calculation processor(s) 101 in the subsequent stage(s) (the number of tasks that have not been completely executed by the calculation processor 101 in the lowermost stage). By reading the counter values from the counters 102, an external controller can grasp the number of tasks that have not been completely executed yet and can accurately determine the current task execution statuses.

Hereinafter, specific exemplary embodiments will be described in more detail with reference to drawings. In the following exemplary embodiments, like components will be denoted by like reference characters, and redundant description thereof will be omitted.

First Exemplary Embodiment

A first exemplary embodiment will be described in detail with reference to drawings.

Figure 2:
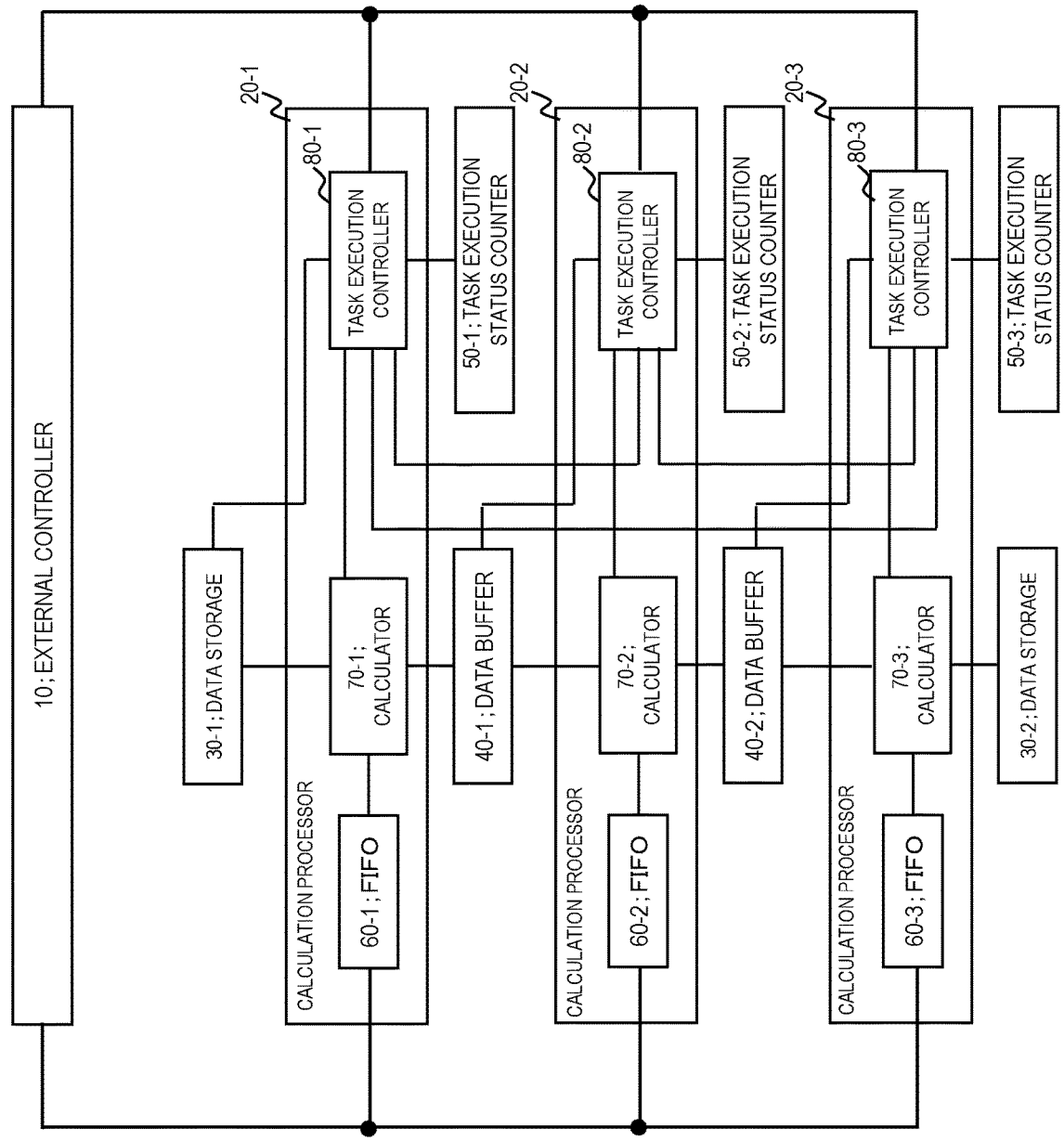
FIG. 2 illustrates an example of a schematic configuration of a data processing system according to a first exemplary embodiment.

FIG. 2 illustrates an example of a schematic configuration of a data processing system according to the first exemplary embodiment. As illustrated in FIG. 2, the data processing system includes an external controller 10, a plurality of calculation processors 20-1 to 20-3 cascaded, data storages 30-1 and 30-2, data buffers 40-1 and 40-2, and a plurality of task execution status counters 50-1 to 50-3.

In the following description, unless there is a particular reason to distinguish the calculation processors 20-1 to 20-3 from each other, any one of the calculation processors 20-1 to 20-3 will simply be referred to as "a calculation processor 20". While other components are also denoted by hyphenated reference characters, any one of the components of one kind will be denoted by the corresponding reference character before its hyphen as a representative of this kind of components.

The external controller 10 is a module (means) for inputting tasks to the plurality of calculation processors 20. The plurality of calculation processors 20 process these inputted tasks in the order in which the calculation processors 20 are cascaded. To grasp the task execution statuses of the calculation processors 20, the external controller 10 outputs requests for transmission of the statuses of the individual calculation processors 20 to the calculation processors 20 (more accurately, to task execution controllers 80 described below).

The data storage 30-1 is a memory in which calculation target data is stored. The data storage 30-2 is a memory in which a calculation result obtained by the plurality of calculation processors 20 (a result obtained by processing a task) is stored.

An individual one of the calculation processors 20 is a module (means) for executing a desired calculation, based on calculation data stored in the data storage 30-1 or the corresponding data buffer 40 and a task control signal supplied from the external controller 10.

An individual one of the data buffers 40 is a memory for forwarding a calculation result obtained by the calculation processor 20 in the previous stage to the calculation processor 20 in the subsequent stage. A calculation result obtained by a calculation processor 20 is stored in the data buffer 40 or data storage 30-2 in the subsequent stage.

An individual calculation processor 20 includes a FIFO 60, a calculator 70, and a task execution controller 80.

An individual one of the FIFOs 60 is a first-in first-out memory in which a task control signal acquired from the external controller 10 is stored. An individual one of the FIFOs 60 holds a task command that is inputted to the corresponding calculator 70.

An individual one of the calculators 70 is a module (means) for performing a predetermined calculation (for example, FFT, filtering, etc.) on data stored in the data storage 30-1 or the corresponding data buffer 40. An individual one of the calculators 70 processes a task in response to a task command supplied externally (from the external controller 10).

An individual one of the task execution controllers 80 controls execution of a task command by the corresponding calculator 70. More specifically, an individual one of the task execution controllers 80 controls, for example, timing of inputting a task control signal from the corresponding FIFO 60 to the corresponding calculator 70, timing of reading data from the corresponding data buffer 40 or the like and inputting the data to the corresponding calculator 70, and timing of outputting a calculation result to the corresponding data buffer 40 or the like.

An individual one of the task execution status counters 50 is arranged per calculation processor 20 and is a counter that indicates a task execution status of the corresponding calculation processor 20. A count value of an individual one of the plurality of task execution status counters 50 is incremented (by 1) when a corresponding one of the calculation processors 20 starts to process a task and is decremented (by 1) when the calculation processor 20-3 in the lowermost stage ends the task.

An individual one of the task execution controllers 80 controls a corresponding one of the task execution status counters 50 arranged for the respective calculation processor 20 based on a predetermined rule. In addition, when a task execution controller 80 receives a request for transmission of a status from the external controller 10, the task execution controller 80 reads the count value of the corresponding task execution status counter 50 and outputs the count value to the external controller 10.

As illustrated in FIG. 2, the external controller 10 is connected to the FIFOs 60 and the task execution controllers 80 in the calculation processors 20. An individual one of the calculators 70 is connected to the data storage 30-1 or the corresponding data buffer 40 to acquire calculation data. An individual one of the calculators 70 is connected to the corresponding data buffer 40 or the data storage 30-2 to transmit a calculation result to the calculation processor 20 in the subsequent stage or the like. An individual one of the calculator 70 is connected to the corresponding FIFO 60 to acquire a task control signal from the external controller 10. To know a status of the data storage 30-1 or the corresponding data buffer 40 (to acquire data from the corresponding data buffer 40 or the like), an individual one of the task execution controllers 80 is connected to these memories.

An individual one of the task execution controllers 80 is connected to the task execution controllers 80 in the other calculation processors 20, to notify the other calculation processors 20 of the current processing status (the processing status of the corresponding calculation processor 20). In addition, while not illustrated in FIG. 2, an individual one of the task execution controllers 80 is connected to the corresponding FIFO 60 and controls timing of supplying a task control signal from the corresponding FIFO 60 to the corresponding calculator 70.

While three calculation processors 20 are cascaded in FIG. 2, the number of calculation processors 20 is not of course limited to 3. It is only necessary that a plurality of calculation processors 20 be included in the data processing system.

As described above, an individual one of the task execution controllers 80 controls the corresponding task execution status counter 50 arranged for its own module based on a predetermined rule.

Figure 3:
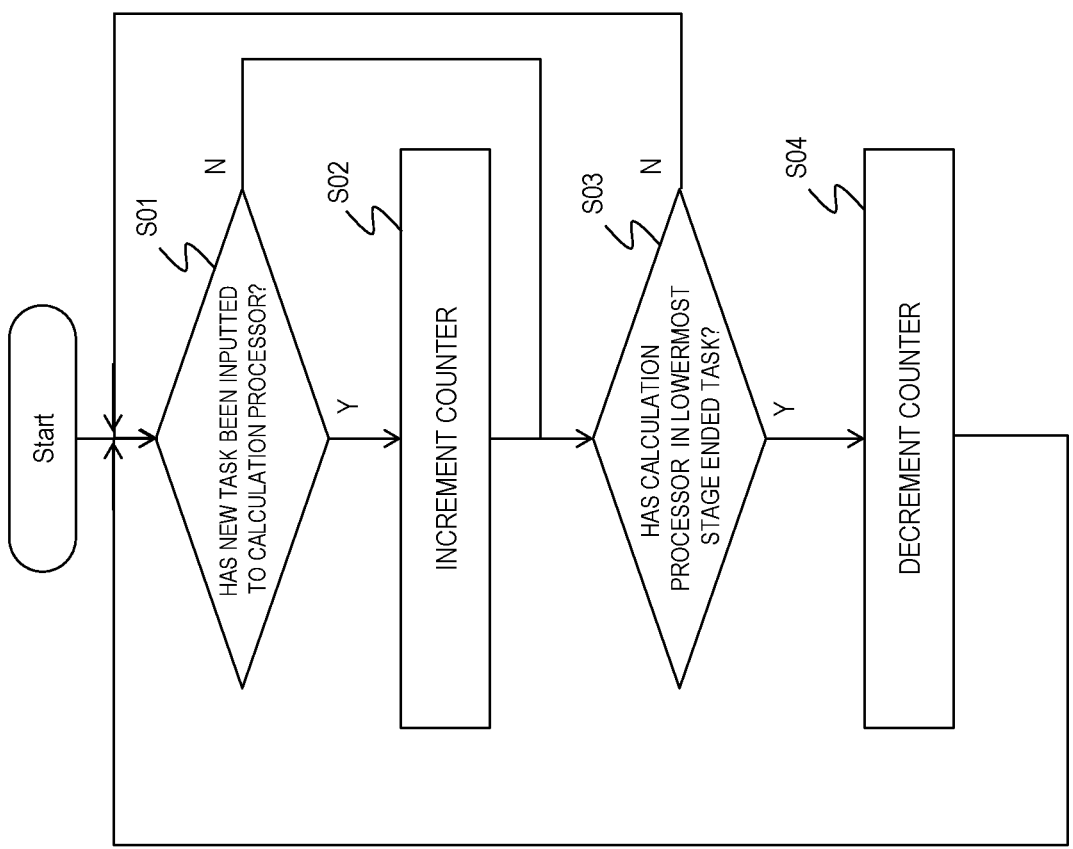
FIG. 3 is a flowchart illustrating an example of an operation of a task execution controller according to the first exemplary embodiment.

FIG. 3 is a flowchart illustrating an example of an operation of a task execution controller 80.

In step S01, a task execution controller 80 determines whether the task execution controller 80 has supplied a new task to its own module (to the corresponding calculation processor 20).

If the task execution controller 80 has supplied a new task (Yes in step S01), the task execution controller 80 increments the count value of the corresponding task execution status counter 50 (step S02).

If the task execution controller 80 has not supplied a new task (No in step S01), the task execution controller 80 determines whether the calculation processor 20-3 in the lowermost stage (the last stage) has ended the task (step S03). Specifically, the task execution controller 80 determines that the calculation processor 20-3 has ended the task when the task execution controller 80 acquires a status indicating the end of the corresponding calculation from the task execution controller 80-3 included in the calculation processor 20-3 in the lowermost stage. The task execution controller 80-3 included in the calculation processor 20-3 in the lowermost stage makes the above determination based on its own processing result.

If the calculation processor 20-3 in the lowermost stage has ended the task (Yes in step S03), the task execution controller 80 decrements the count value of the corresponding task execution status counter 50 (step S04).

If the calculation processor 20-3 in the lowermost stage has not ended the task (No in step S03), the task execution controller 80 returns to step S01 and continues the processing.

[Description of Operation]

Next, an operation of the data processing system according to the first exemplary embodiment will be described with reference to a drawing. The description of the operation presupposes the following conditions.

The operation assumes that the data storage 30-1 holds calculation data calculated by the corresponding calculation processor 20.

The operation also assumes, for ease of description, that two tasks are executed in the data calculation system. The first task is executed by the three calculation processors 20-1 to 20-3. This task will be referred to as a task A. The second task is executed by the two calculation processors 20-2 and 20-3. This task will be referred to as a task B. A command (a task control signal) relating to the task A will be referred to as a task command A, and a command relating to the task B will be referred to as a task command B.

An individual one of the task execution controllers 80 in the calculation processors 20 notifies the task execution controllers 80 in the other calculation processors 20 of "standby (0)", "during execution (1)", or "processing ended (2)" as a status of its own module. This notification is transmitted each time the status of the corresponding calculation processor 20 changes. In addition, if no task command is held in a FIFO 60, the corresponding task execution controller 80 sets the status of its own module to "standby (0)". In addition, if a task command held in a FIFO 60 does not relate to a task directed to its own module, the corresponding task execution controller 80 reads calculation data from the data storage 30-1 or the corresponding data buffer 40 connected in the previous stage of its own module (the corresponding calculation processor 20) and stores the data in the data storage 30-2 or data buffer 40 in the subsequent stage.

Figure 4:
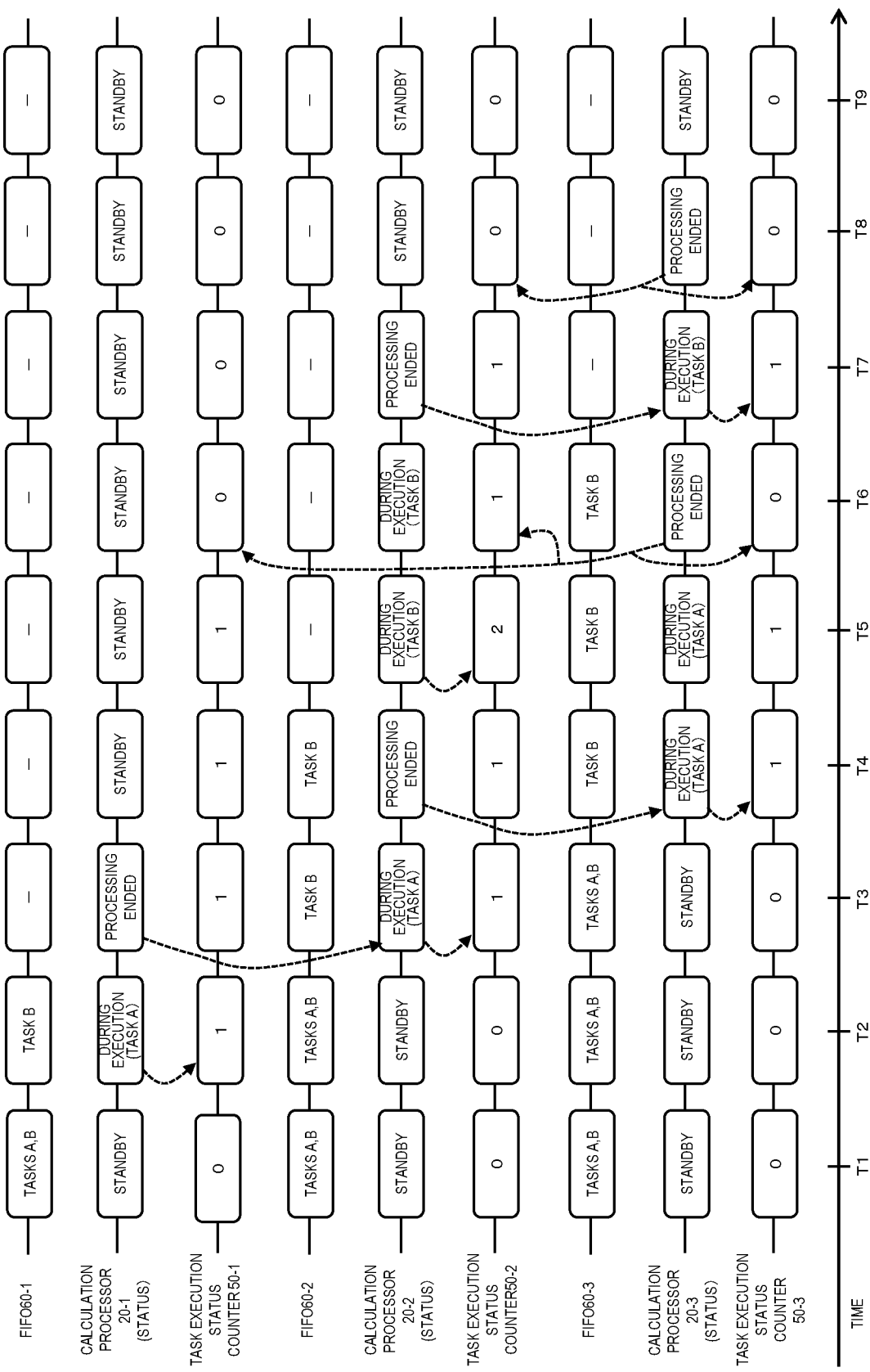
FIG. 4 illustrates an operation of the data processing system according to the first exemplary embodiment.

First, commands (the task commands A and B) for executing the respective tasks A and B are inputted by the external controller 10 (see time T1 in FIG. 4). When the task commands are inputted from the external controller 10, the corresponding FIFO 60 and task execution controller 80 acquire the task commands. When the task commands A and B are inputted to the FIFO 60, these task commands A and B are temporarily accumulated in the FIFO 60.

When the task command A is inputted to the task execution controller 80, the task execution controller 80 determines whether to cause the calculator 70 of its own module to execute the inputted task. In this operation, the task execution controller 80 determines whether to input the task based on the status of the calculator of its own module ("standby", "during execution", or "processing ended") and the status of the calculation processor 20 in the previous stage. For example, the task execution controller 80-1 in the calculation processor 20-1, which is not connected to any calculation processor 20 in the previous stage, determines whether to input the task based on the status of the calculator 70-1 in its own module. More specifically, if the status of its own module indicates "standby (0)" or "processing ended (2)", the task execution controller 80-1 determines that a new task can be inputted.

The task execution controller 80-2 in the calculation processor 20-2, which is connected to the calculation processor 20-1 in the previous stage, determines whether to input a task based on the status of its own module and the status of the calculation processor 20-1 in the previous stage. More specifically, when the status of its own module indicates "standby (0)" or "processing ended (2)" and when the status of the calculation processor 20-1 in the previous stage indicates "standby (0)" or "processing ended (2)", the task execution controller 80-2, which is connected to the calculation processor 20 in the previous stage, determines that a new task can be inputted.

As described above, an individual one of the task execution controllers 80 determines that a task can be executed when no calculation is being executed in its own module and when calculation processing has already been ended in the previous stage.

Since the status of the calculation processor 20-1 indicates "standby (0)" at time T1 in FIG. 4, the task execution controller 80-1 inputs the task command A for executing the task A to the calculator 70-1 (see time T2 in FIG. 4).

Since a new task has been inputted to the calculation processor 20-1, the count value of the task execution status counter 50-1 is incremented from "0" to "1" in accordance with the flowchart in FIG. 3. In addition, the status of the calculation processor 20-1 changes to "during execution (1)". Currently (at time T2), this counter value indicates that the calculation processor 20-1 is executing a single task or waiting for completion of a task.

When the calculation processor 20-1 ends the processing of the task A, the status of the calculation processor 20-1 indicates "processing ended (2)" (see time T3 in FIG. 4). The task execution controller 80-1 notifies the other task execution controllers 80-2 and 80-3 of the status ("processing ended (2)") of its own module. When the status of the calculation processor 20-1 changes to "processing ended (2)", the task A can be inputted to the calculation processor 20-2. Namely, the task execution controller 80-2 determines that the task A can be inputted.

The task execution controller 80-2 inputs the task command A for executing the task A to the calculator 70-2. Since this new task has been inputted to the calculator 70-2, the task execution controller 80-2 increments the count value of the task execution status counter 50-2 from "0" to "1". In addition, the status of the calculation processor 20-2 changes to "during execution (1)".

The count value of the task execution status counter 50-1 corresponding to the calculation processor 20-1 maintains "1". This is because the calculation processor 20-3 in the lowermost stage has not ended the task.

Since the calculation processor 20-1 does not process the task command B accumulated in the FIFO 60-1 in its own module, the calculation processor 20-1 reads calculation data for the task command B from the data storage 30-1 and stores the calculation data in the data buffer 40-1. In addition, since the calculation processor 20-1 does not process the task command B in its own module, the status of its own module is set to "standby (0)".

Subsequently, when the calculation processor 20-2 ends the processing of the task A, the status of the calculation processor 20-2 changes to "processing ended (2)" (see time T4 in FIG. 4). In addition, the task execution controller 80-2 notifies the other task execution controllers 80-1 and 80-3 that the processing has been ended (the end of the task A).

When the calculation processor 20-2 ends the processing of the task A, the task A can be inputted to the calculation processor 20-3. The task execution controller 80-3 determines that a new task can be inputted and inputs the task command A to the calculator 70-3. Since this new task has been inputted to the calculation processor 20-3, the count value of the task execution status counter 50-3 is incremented from "0" to "1".

In addition, when the calculation processor 20-2 ends the processing of the task A, since the task command B is stored in the corresponding FIFO 60-2, the task execution controller 80-2 determines whether the calculator 70-2 can execute processing relating to the task B. In this case, since the task A has been completely executed in its own module and since the status of the calculation processor 20-1 in the previous stage indicates "standby (0)", the task execution controller 80-2 determines that the calculator 70-2 can execute the processing of the task B. As a result, the task command B is inputted to the calculator 70-2 (see time T5 in FIG. 4).

Since this new task has been inputted to the calculation processor 20-2, the count value of the task execution status counter 50-2 is incremented from "1" to "2". This count value of the task execution status counter 50-2 indicates that two tasks are being executed or waiting for completion in the data processing system.

Next, when the calculation processor 20-3 ends the processing of the task A (see time T6 in FIG. 4), the task execution controller 80-3 notifies the other task execution controllers 80-1 and 80-2 of the end of the task A. In this case, since the calculation processor 20-3 in the lowermost stage has ended the task, the task execution controllers 80-1 and 80-2 decrement the count values of the respective task execution status counters 50-1 and 50-2. As a result, the count value of the task execution status counter 50-1 changes from "1" to "0", and the count value of the task execution status counter 50-2 changes from "2" to "1".

Subsequently, the calculation processor 20-2 ends the calculation processing of the task B (see time T7 in FIG. 4), and the task execution controller 80-2 notifies the other task execution controllers 80-1 and 80-3 of the end of the task B.

When the calculation processor 20-3 ends the processing of the task A, since the task command B is stored in the corresponding FIFO 70-3, the task execution controller 80-3 determines whether the calculator 70-3 can execute the processing of the task B. In this case, since the task A has been completely executed in its own module and since the calculation processor 20-2 in the previous stage has already ended the calculation processing of the task B, the task execution controller 80-3 determines that the calculator 70-3 can execute the processing of the task B. As a result, the task command B is inputted to the calculator 70-3.

When the processing of the task A ends at time T6, the count value of the task execution status counter 50-3 changes to "0". When the processing of the task B starts at timing T7, the count value changes to "1".

Subsequently, the calculation processor 20-3 ends the processing of the task B (see time T8 in FIG. 4). The task execution controller 80-3 notifies the task execution controllers 80-1 and 80-2 that the task B has been processed, and the count values of all the task execution status counters 50 indicate "0".

In addition, since no task commands are stored in the FIFOs 60-2 and 60-3, the status of the calculation processor 20-3 indicates "standby (0)" (see time T9 in FIG. 4). The state at time T9 in FIG. 4 is the same as the state in which the task commands A and B have not been inputted to the data calculation system (before time T1) and a new task can be processed.

If the task execution controllers 80 receive a status transmission request from the external controller 10, the task execution controllers 80 read the count values of the respective task execution status counters 50 and transmit the respective count values to the external controller 10. By receiving the count values in response to the transmission request, the external controller 10 acquires the count values held by the respective task execution status counters 50. By checking the count values, the external controller 10 can grasp the task execution statuses of the respective calculation processors 20. For example, by acquiring the count values of the respective task execution status counters 50 at time T5 in FIG. 4, the external controller 10 can grasp that the two tasks A and B are being processed in a parallel way, one of the tasks A and B being processed by the calculation processor 20-3 in the lowermost stage and the other task being processed by the calculation processor 20-2 in the stage immediately before the lowermost stage. In addition, at time T6 in FIG. 4, the external controller 10 can grasp that one task is being processed by the calculation processor 20-2.

As described above, the plurality of task execution controllers 80 in the data processing system are connected to each other, and an individual one of the task execution controllers 80 notifies the other task execution controllers 80 of the task execution status of the corresponding calculator 70 included in the calculation processor 20 including this task execution controller 80. An individual task execution controller 80 determines whether to input a task command to the corresponding calculator 70 based on a task execution status of which the task execution controller 80 has been notified. In addition, an individual task execution controller 80 is connected to a corresponding task execution status counter 50, increments the count value of the corresponding counter when inputting a new task command to a corresponding calculator 70, and decrements the count value of the corresponding counter when receiving a notification about the end of the task from the task execution controller 80-3 included in the calculation processor 20-3 in the lowermost stage.

There are cases in which, before the calculation processor 20-3 ends the processing of the task A, the calculation processor 20-2 ends the task B and another task (for example, a task C) is stored in the FIFO 60-2 in the calculation processor 20-2. In such cases, if a command corresponding to the task C can be inputted to the calculation processor 20-2, the task C is executed by the calculation processor 20-2 and the count value of the corresponding task execution status counter 50-2 changes from "2" to "3". Subsequently, when the calculation processor 20-3 ends the processing of the task A, the count value of the task execution status counter 50-2 changes from "3" to "2".

As described above, in the first exemplary embodiment, a task execution status counter 50 is arranged for an individual one of the cascaded calculation processors 20. The count value of an individual task execution status counter 50 is incremented when a new task is inputted to its own module. In addition, the count value is decremented when its own module and the calculation processor 20 in the lowermost stage end the corresponding task. As a result, the upper external controller 10 can grasp not only the task execution statuses of the calculation processors 20 included in the data processing system but also various statuses such as the stage in which a task is being processed and the number of tasks being processed in a parallel manner in the data processing system.

In addition, circuits needed to realize the above grasping are the task execution status counters 50. Namely, the task execution statuses can be grasped by using circuits as simple as counters. By accurately grasping the task execution statuses in the data processing system, the external controller 10 can easily synchronize task input timings and switch task flows, for example.

Second Exemplary Embodiment

Next, a second exemplary embodiment will be described in detail with reference to a drawing.

The first exemplary embodiment presupposes that a single calculation processor 20 executes a single calculation process per task. The second exemplary embodiment will be described by assuming a case in which calculation processors 20 execute a plurality of kinds of calculation processing for a task, such as a case in which the calculation processor 20-1 in the initial stage executes two kinds of calculation processing for a task, the calculation processor 20-2 in the next stage executes one kind of calculation processing, and the calculation processor 20-3 in the last stage executes three kinds of calculation processing.

Since the data processing system according to the second exemplary embodiment has the same configuration as that described with reference to FIG. 2, redundant description thereof will be omitted.

Figure 5:
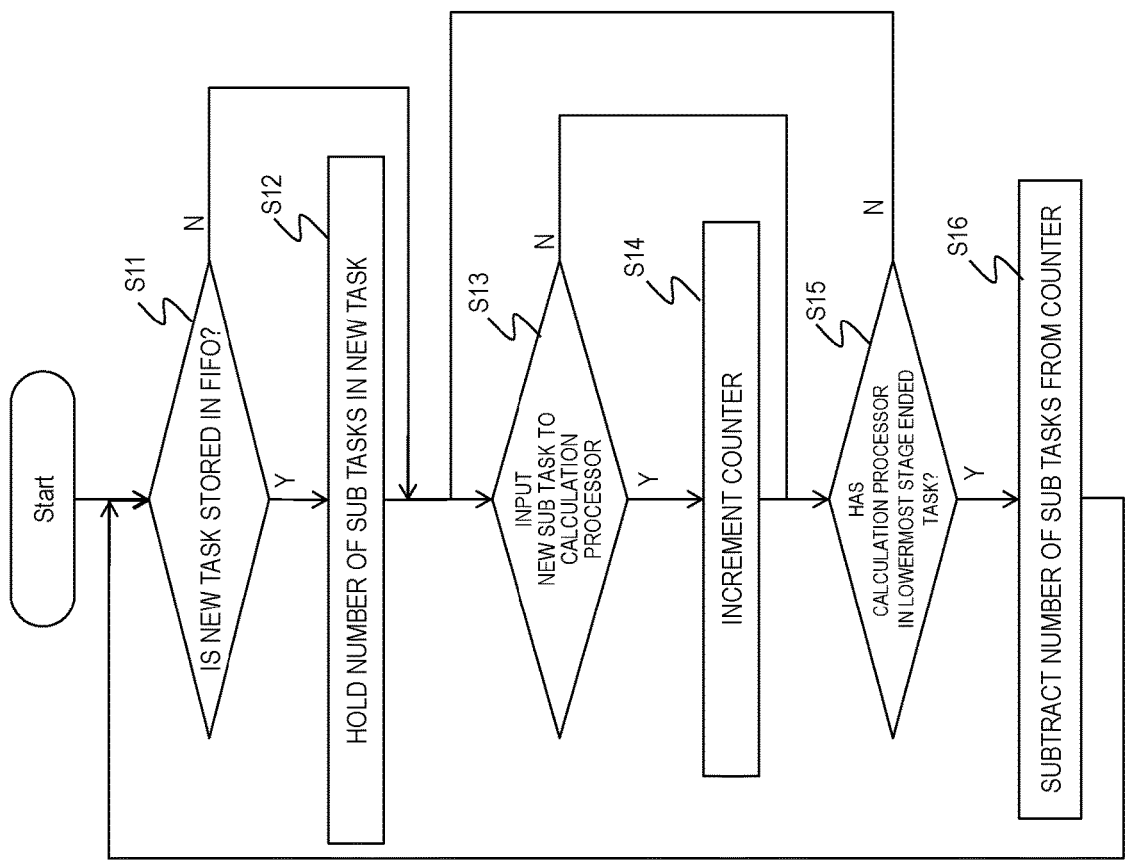
FIG. 5 is a flowchart illustrating an example of an operation of a task execution controller according to a second exemplary embodiment.

In the second exemplary embodiment, the way the task execution controllers 80 control the respective task execution status counters 50 is different. Next, an operation of a task execution controller 80 according to the second exemplary embodiment will be described with reference to FIG. 5.

First, a task execution controller 80 determines whether a new task is stored in the corresponding FIFO 60 (step S11).

If a new task is stored (Yes in step S11), the task execution controller 80 holds the number of sub tasks in the task executed in its own module (the corresponding calculation processor 20) (step S12). Specifically, since the number of sub tasks executed in its own module is predetermined depending on the task processed, this predetermined value is held in a memory (not illustrated in FIG. 2). For example, in the above example, the task execution controller 80-1 in the calculation processor 20-1 holds "2" as the number of sub tasks.

If no new tasks are stored (No in step S11), the task execution controller 80 executes step S13.

The task execution controller 80 increments the count value of the corresponding task execution status counter 50 each time a sub task is executed (Yes in step S13; step S14). Subsequently, the task execution controller 80 determines whether the calculation processor 20 in the lowermost stage has ended the task (step S15).

When the calculation processor 20 in the lowermost stage ends all the sub tasks of this task (the end of this task), the corresponding task execution controller 80 notifies the other task execution controllers 80 of the end of the task (Yes in step S15).

Subsequently, the task execution controller 80 subtracts the number corresponding to the number of sub tasks held in the step S12 from the task execution status counter 50 (step S16).

In this way, the count value of an individual task execution status counter 50 is incremented each time the corresponding calculation processor 20 processes the sub task(s) constituting a single task. When the calculation processor 20-3 in the lowermost stage ends this single task, the number of sub tasks constituting this task is decremented from the relevant count values. According to the second exemplary embodiment, by controlling the task execution status counters 50 based on the number of sub tasks to be processed, the execution statuses of the detailed sub tasks in a task can be grasped. As a result, the external controller 10 can realize finer task control processing.

Third Exemplary Embodiment

Next, a third exemplary embodiment will be described in detail with reference to a drawing.

Figure 6:
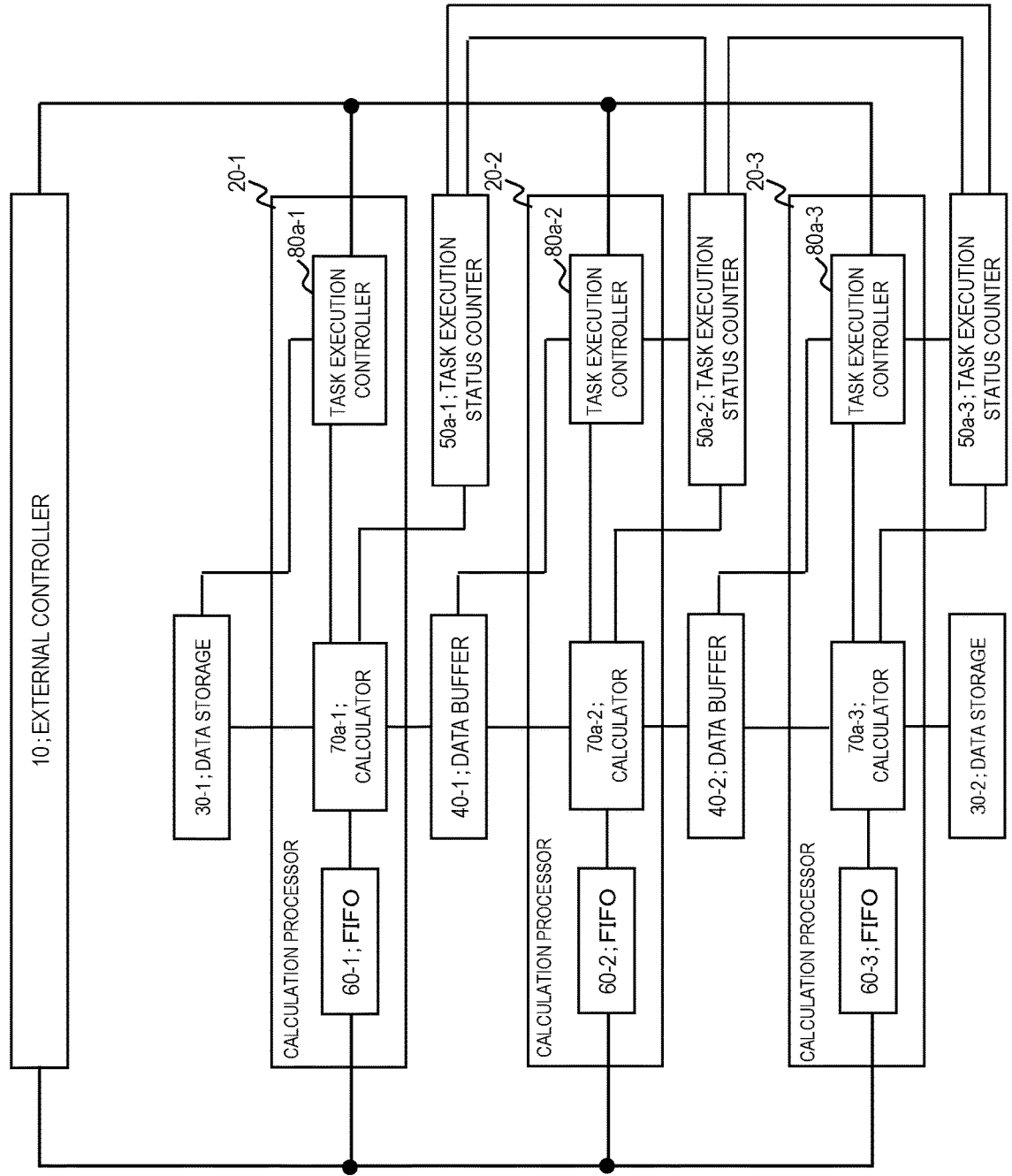
FIG. 6 illustrates an example of a schematic configuration of a data processing system according to a third exemplary embodiment.
Figure 7:
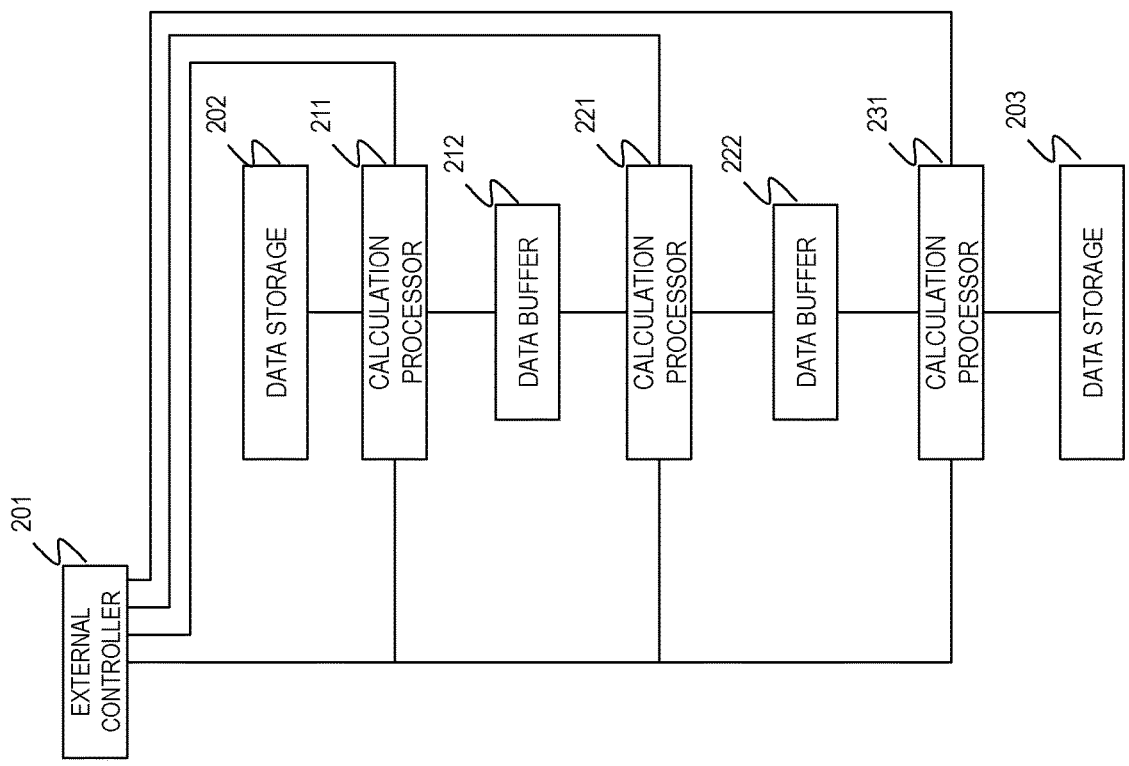
FIG. 7 illustrates an example of a schematic configuration of a data processing system.

In the first exemplary embodiment, the task execution controllers 80 in the calculation processors 20 are connected to the respective task execution status counters 50, and the task execution controllers 80 control the respective task execution status counters 50. In the third exemplary embodiment, calculators 70a in calculation processors 20 are connected to task execution status counters 50a, respectively. In addition, an individual task execution status counter 50a controls its own count value in coordination with the other task execution status counters 50a. Specifically, as illustrated in FIG. 6, an individual task execution status counter 50a is connected to a corresponding calculator 70a and is also connected to the other task execution status counters 50a.

In the first exemplary embodiment, the task execution controllers 80 exchange information about the statuses of their own modules and control the respective task execution status counters 50. In the third exemplary embodiment, the task execution status counters 50a exchange information about the above statuses with each other and control their own counter values. In this operation, an individual task execution status counter 50a acquires the processing status of a task from the corresponding calculator 70a, and when the status changes, the task execution status counter 50a notifies the other task execution status counters 50a of the changed status.

Since an operation in the data processing system according to the third exemplary embodiment is the same as that according to the first exemplary embodiment, redundant description thereof will be omitted. The third exemplary embodiment can of course realize the control processing of the sub tasks described in the second exemplary embodiment.

As described above, an individual calculator 70a is connected to a corresponding task execution status counter 50a, and the plurality of task execution status counters 50a are connected to each other. When a new task is inputted to a calculator 70a, the corresponding task execution status counter 50a increments its own count value and notifies the other task execution status counters 50a of the task execution status of the corresponding calculator 70a. In addition, when the task execution status counter 50a receives a notification about the end of the task from the task execution status counter 50a corresponding to the calculation processor 20-3 in the lowermost stage, the task execution status counter 50a decrements its count value.

In the third exemplary embodiment as well, by accurately grasping the task execution statuses in the data processing system, an external controller 10 can easily synchronize task input timings and switch task flows, for example.

While the industrial applicability of the present invention is apparent from the above description, the present invention is suitably applicable to a digital signal processing system using a multi-core processor or an array processor including a plurality of calculation processors. In particular, the present invention is suitably applicable to stream processing in which a plurality of tasks are sequentially executed on many data.

The above exemplary embodiments can partly or entirely be described as, but not limited to, the following modes.

[Mode 1]

See the data processing system according to the above first aspect.

[Mode 2]

The data processing system according to mode 1; wherein an individual one of the plurality of calculation processors includes a calculator that processes a task in response to a task command supplied externally.

[Mode 3]

The data processing system according to mode 2; wherein an individual one of the plurality of calculation processors includes a first-in first-out memory that holds a task command inputted to a corresponding one of the calculators.

[Mode 4]

The data processing system according to mode 3; wherein an individual one of the plurality of calculation processors includes a task execution controller that controls execution of the task command inputted to the corresponding calculator.

[Mode 5]

The data processing system according to mode 4;

wherein the plurality of task execution controllers are connected to each other;

wherein an individual one of the task execution controllers notifies the other task execution controllers of an execution status of a task executed by a corresponding calculator included in the same calculation processor including this task execution controller; and wherein an individual one of the task execution controllers determines whether to input the task command to the corresponding calculator, depending on the task execution status of which this task execution controller has been notified.

[Mode 6]

The data processing system according to mode 5;

wherein an individual one of the task execution controllers is connected to a corresponding one of the counters;

wherein an individual one of the task execution controllers increments a count value of the corresponding counter when inputting a new task command to the corresponding calculator; and wherein an individual one of the task execution controllers decrements a count value of the corresponding counter when receiving a notification about an end of a task from the task execution controller included in the calculation processor in the lowermost stage among the plurality of calculation processors.

13

[Mode 7]
The data processing system according to mode 5; wherein an individual one of the calculators is connected to a corresponding one of the counters, and the plurality of counters are connected to each other;
wherein an individual one of the counters increments its count value when a new task is inputted to the corresponding calculator, notifies the other counters of an execution status of a task executed by the corresponding calculator, and decrements its count value when receiving a notification about an end of a task from the counter corresponding to the calculation processor in the lowermost stage among the plurality of calculation processors.

[Mode 8]
The data processing system according to any one of modes 1 to 7;
wherein a count value of an individual one of the plurality of counters is incremented each time the corresponding calculation processor processes a sub task(s) constituting a single task; and
wherein, when the calculation processor in the lowermost stage among the plurality of calculation processors ends the single task, the number of sub tasks constituting the single task is decremented from the count value.

[Mode 9]
The data processing system according to any one of modes 1 to 8, further comprising an external controller that acquires count values held by the plurality of counters, respectively.

[Mode 10]
See the data processing method according to the above second aspect. The mode according to mode 10 can be expanded in the same way as the mode according to mode 1 is expanded to the modes according to modes 2 to 9.

The disclosure of the above cited PTL is incorporated herein by reference thereto. Variations and adjustments of the exemplary embodiments and examples are possible within the scope of the overall disclosure (including the claims) of the present invention and based on the basic technical concept of the present invention. Various combinations and selections of various disclosed elements (including the elements in the claims, exemplary embodiments, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 10, 201 external controller
20, 20-1 to 20-3, 101, 211, 221, 231 calculation processor
30, 30-1, 30-2, 202, 203 data storage
40, 40-1, 40-2, 212, 222 data buffer
50, 50-1 to 50-3, 50a, 50a-1 to 50a-3 task execution status counter
60, 60-1 to 60-3 FIFO
70, 70-1 to 70-3, 70a, 70a-1 to 70a-3 calculator
80, 80-1 to 80-3, 80a, 80a-1 to 80a-3 task execution controller
102 counter

14

What is claimed is:
1. A data processing system, comprising:
a plurality of calculation processors cascaded; and
a plurality of task execution status counters connected to the plurality of calculation processors, respectively,
wherein each calculation processor is connected to one task execution status counter,
wherein the calculation processors sequentially process a task in an order in which the calculation processors are cascaded,
wherein when each calculation processor starts processing the task, the corresponding task execution status counter for the calculation processor is incremented,
and wherein when the calculation processor at a lowermost stage ends processing the task, all the task execution status counters for all the calculation processors are decremented.

2. The data processing system according to claim 1, wherein an individual one of the plurality of calculation processors includes a calculator that processes a task in response to a task command supplied externally.

3. The data processing system according to claim 2, wherein an individual one of the plurality of calculation processors includes a first-in first-out memory that holds a task command inputted to a corresponding one of the calculators.

4. The data processing system according to claim 3, wherein an individual one of the plurality of calculation processors includes a task execution controller that controls execution of the task command inputted to the corresponding calculator.

5. The data processing system according to claim 4, wherein the plurality of task execution controllers are connected to each other,
wherein an individual one of the task execution controllers notifies the other task execution controllers of an execution status of a task executed by a corresponding calculator included in the same calculation processor including this task execution controller, and
wherein an individual one of the task execution controllers determines whether to input the task command to the corresponding calculator, depending on the task execution status of which this task execution controller has been notified.

6. The data processing system according to claim 5, wherein an individual one of the task execution controllers is connected to a corresponding one of the counters,
wherein an individual one of the task execution controllers increments a count value of the corresponding counter when inputting a new task command to the corresponding calculator, and
wherein an individual one of the task execution controllers decrements a count value of the corresponding counter when receiving a notification about an end of a task from the task execution controller included in the calculation processor in the lowermost stage among the plurality of calculation processors.

7. The data processing system according to claim 5, wherein an individual one of the calculators is connected to a corresponding one of the counters, and the plurality of counters are connected to each other,
wherein an individual one of the counters increments its count value when a new task is inputted to the corresponding calculator, notifies the other counters of an execution status of a task executed by the corresponding calculator, and decrements its count value when receiving a notification about an end of a task from the counter corresponding to the calculation processor in the lowermost stage among the plurality of calculation processors.

8. The data processing system according to claim 1,
wherein a count value of an individual one of the plurality of counters is incremented each time the corresponding calculation processor processes a sub task(s) constituting a single task, and
wherein, when the calculation processor in the lowermost stage among the plurality of calculation processors ends the single task, the number of sub tasks constituting the single task is decremented from the count value.

9. The data processing system according to claim 1, further comprising an external controller that acquires count values held by the plurality of counters, respectively.

10. A data processing method using a data processing system including a plurality of calculation processors cascaded and a plurality of counters connected to the plurality of calculation processors, respectively, the data processing method comprising:
sequentially processing a task, by the calculation processors, in an order in which the calculation processors are cascaded;
when each calculation processor starts processing the task, incrementing the corresponding task execution status counter for the calculation processor; and
when the calculation processor at a lowermost stage ends processing the task, decrementing all the task execution status counters for all the calculation processors.

* * * * *